United States Patent
Hourai et al.

(10) Patent No.: US 7,312,972 B2
(45) Date of Patent: Dec. 25, 2007

(54) ACTUATOR DRIVING APPARATUS

(75) Inventors: Yasuharu Hourai, Utsunomiya (JP); Kenichi Yoshimura, Utsunomiya (JP)

(73) Assignee: Keihin Corporation, Tokyo (JP)

( * ) Notice: Subject to any disclaimer, the term of this patent is extended or adjusted under 35 U.S.C. 154(b) by 193 days.

(21) Appl. No.: 11/113,191

(22) Filed: Apr. 25, 2005

(65) Prior Publication Data

US 2005/0259482 A1    Nov. 24, 2005

(30) Foreign Application Priority Data

May 21, 2004  (JP) .......................... P 2004-151601

(51) Int. Cl.
*H01H 47/00* (2006.01)
*G05F 1/00* (2006.01)

(52) U.S. Cl. ...................... 361/139; 323/265; 323/266; 327/536

(58) Field of Classification Search ................ 361/139, 361/154; 323/265, 266; 327/536
See application file for complete search history.

(56) References Cited

U.S. PATENT DOCUMENTS

| 4,537,353 | A  | * | 8/1985 | Speranza ................. 239/102.2 |
| 6,437,636 | B2 | * | 8/2002 | Zammattio et al. ......... 327/536 |
| 2005/0029872 | A1 | * | 2/2005 | Ehrman et al. ................ 307/11 |

FOREIGN PATENT DOCUMENTS

JP          6-291379         10/1994

OTHER PUBLICATIONS

LM 117 3-Terminal Adjustable Regulator, 2001, National Semiconductor Corp., pp. 1-6, 12-18.*

* cited by examiner

*Primary Examiner*—Michael Sherry
*Assistant Examiner*—Zeev Kitov
(74) *Attorney, Agent, or Firm*—Squire Sanders & Dempsey L.L.P.

(57) ABSTRACT

An actuator driving circuit for driving an electromagnetic actuator, includes a boosting circuit which boosts a source voltage, and a boosted voltage controller which is connected to an output terminal of the boosting circuit, i.e., the downstream of the boosting circuit, to control a boosted voltage generated by the boosting circuit.

5 Claims, 2 Drawing Sheets

ACTUATOR DRIVING APPARATUS

BACKGROUND OF THE INVENTION

1. Field of the Invention

The present invention relates to a driving apparatus for an actuator.

Priority is claimed on Japanese Patent Application No. 2004-151601, filed May 21, 2004, the content of which is incorporated herein by reference.

2. Description of Related Art

Recently, some automobiles are equipped with an active control engine mount (which may be referred to as an "ACM" hereinafter) for reducing vibration of an internal combustion engine. Japanese Unexamined Patent Application, First Publication, No. H06-291379, published on Oct. 18, 1994, discloses such an ACM.

The active control engine mount is driven by an actuator utilizing, for instance, a solenoid or the like which is controlled by an actuator driving apparatus. The actuator driving apparatus controls the actuator to generate a vibration having a phase opposite to the vibration of the engine. It is required for the actuator to have a driving force and a response speed sufficient to support the engine and to respond to the vibration of the engine. Because of this requirement, the actuator is supplied with a driving voltage boosted or raised by a booster connected to and supplied with an electric source from an automobile battery.

Such a conventional actuator driving apparatus will be described with reference to FIG. 4.

An actuator driving apparatus 30 includes a boosting circuit 31 which boosts a voltage of an automobile battery (not shown) and a voltage dividing circuit 32 which divides the voltage boosted by the boosting circuit 31. The actuator driving apparatus 30 is equipped with a booster IC 33 which is connected to the voltage dividing circuit 32. The voltage dividing circuit 32 consists of resistors 35 and 36 which are serially connected between an output terminal of the boosting circuit 31 and a ground 34. The booster IC 33 is connected to a junction 37 of the resistors 35 and 36. An electromagnetic actuator 38 is connected to the output terminal of the boosting circuit 33. Thus, the booster IC monitors the voltage boosted by the boosting circuit 33 through the voltage dividing circuit 32 so as to hold the boosted voltage within a predetermined voltage range.

The actuator driving apparatus 30 thus constructed has the following problems because it operates such that the output of the boosting circuit 31 is held within a predetermined voltage range. That is, when the input voltage to the actuator driving apparatus 30 is decreased due to, for example, the decrease in the voltage of the automobile battery used as the electric source, the input current to the actuator driving apparatus 30 is increased so as to overheat the actuator driving apparatus 30. To prevent this, the operation of the boosting circuit 31 must be stopped.

Alternatively, to prevent or hinder the input current to the actuator driving apparatus 30 from increasing, it may be considered that an appropriate program for preventing the overheating be stored in the actuator driving apparatus 30 to cause the output current from the boosting circuit 31 to be reduced when the input voltage decreases. In the manner, however, the control for driving the electromagnetic actuator 38 would apparently be complicated.

SUMMARY OF THE INVENTION

It is, therefore, an object of the present invention is to provide an actuator driving circuit capable of preventing itself from overheating without interrupting the operation of a boosting circuit.

To achieve the above object, an actuator driving circuit for driving an electromagnetic actuator (an electromagnetic actuator 2 in a preferred embodiment) according a first aspect of the present invention includes a boosting circuit (a boosting circuit 4 in the preferred embodiment) which boosts a source voltage, and a boosted voltage controller (a divided voltage restricting circuit 23 in the preferred embodiment) which is connected to an output terminal of the boosting circuit, i.e., the downstream of the boosting circuit.

The actuator driving circuit having the above structure can hold a boosted voltage sufficient to continue driving the electromagnetic actuator which is always in operation. It is possible, therefore, to prevent the boosting circuit from overheating due to increase of the current supplied to the boosting circuit by decreasing the boosted voltage at minimum but sufficient amount when the source voltage becomes low.

An actuator driving circuit according to a second aspect of the present invention further includes a voltage dividing circuit (a voltage dividing circuit 16 in the preferred embodiment) which divides the boosted voltage (a boosted voltage V2 in the preferred embodiment) generated by the boosting circuit, and a booster IC (a booster IC 15 in the preferred embodiment) which monitors the boosted voltage generated by the boosting circuit through the voltage dividing circuit, wherein the boosted voltage controller is provided between the output terminal of the boosting circuit and an input terminal of the booster IC.

The actuator driving circuit thus constructed can surely reduce the boosted voltage into an appropriate level by the booster IC which monitors the boosted voltage generated by the boosting circuit when the source voltage becomes low.

In an actuator driving apparatus according to a third aspect of the present invention, the boosted voltage controller is formed of a resistor (a resistor R3 in the preferred embodiment) and a switch (a switch S1 in the preferred embodiment).

The actuator driving circuit having the above structure can perform the control for the shortage of the source voltage by means of hardware without any addition or improvement of software.

DETAILED DESCRIPTION OF THE INVENTION

A preferred embodiment of the present invention will now be described in reference to the drawings. An actuator driving circuit according to the preferred embodiment is used in a hybrid automobile which can reduce the fuel consumption by partially stopping or pausing excess cylinders during a low-speed drive of the automobile, for example.

Figure 1:
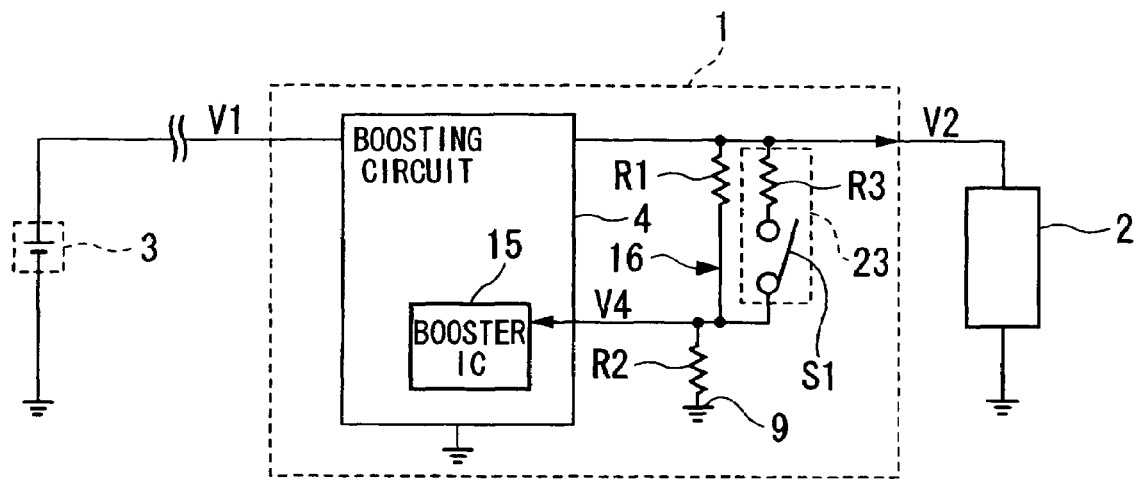
FIG. 1 is a block diagram showing an actuator driving circuit according to an embodiment of the present invention.

An actuator driving circuit 1 shown in FIG. 1 controls and drives an electromagnetic actuator 2 equipped in an active control engine mount (ACM) which supports an engine. The actuator driving circuit 1 has a boosting circuit 4 which boosts a voltage V1 (12 V, for instance) of a battery 3 used as a source voltage. The boosting circuit 4 supplies a boosted voltage V2 (24 V, for instance) after boosting to the electromagnetic actuator 2 to drive the same.

The active control engine mount (ACM) is equipped with an engine mount section filled with liquid such as oil. The electromagnetic actuator 2 applies the pressure, whose phase is opposite to that of the vibration of the engine, to a housing of the engine mount section by a piston of the actuator 2. This operation makes it possible to reduce the amount of conveyance of the vibration of the engine to the body of the automobile by damping and suppressing the vibration of the engine with the applied pressure having the opposite phase to the vibration.

Figure 2:
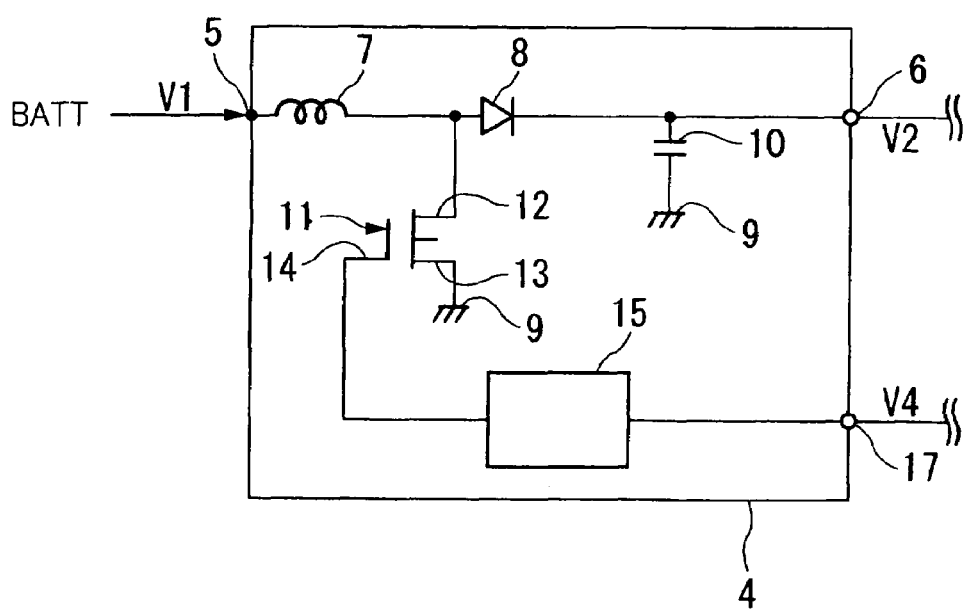
FIG. 2 is a circuit diagram showing a boosting circuit used in the embodiment of the present invention shown in FIG. 1.

As shown in FIG. 2, the boosting circuit 4 is provided with an input terminal 5 connected to the battery 3 and an output terminal 6 outputting the boosted voltage V2. The input terminal 5 is connected to a boosting coil 7 constituting the boosting circuit 4. Between the boosting coil 7 and the output terminal 6, a rectifying diode 8 is connected in series. The rectifying diode 8 is arranged in a direction of easy flow from the input terminal 5 to the output terminal 6. A smoothing capacitor 10 is connected between the ground 9 and a junction between the rectifying diode 8 and the output terminal 6.

At a junction between the boosting coil 7 and the rectifying diode 8, a source electrode 12 of a field-effect transistor (FET) 11 is provided. A drain electrode 13 of the field-effect transistor 11 is connected to the ground 9 while a gate electrode 14 is connected to a booster IC 15. The booster IC 15 has a monitor terminal 17 to receive an output voltage V4 of a voltage dividing circuit 16 which will be explained later.

Figure 3:
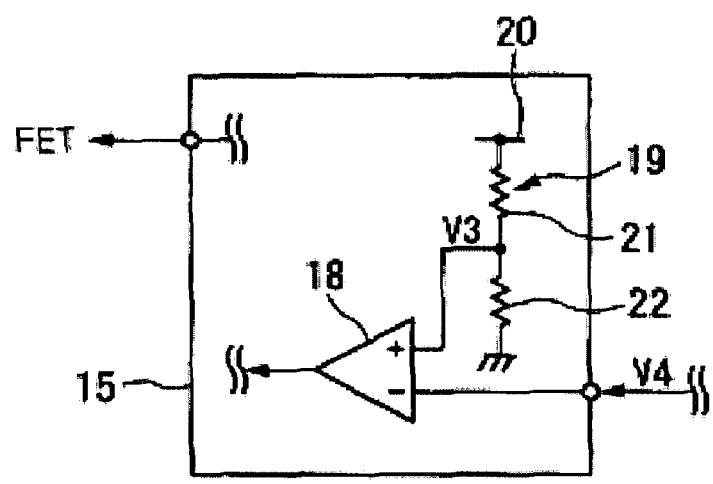
FIG. 3 is a circuit diagram showing a booster IC used in the embodiment of the present invention shown in FIG. 1.
Figure 4:
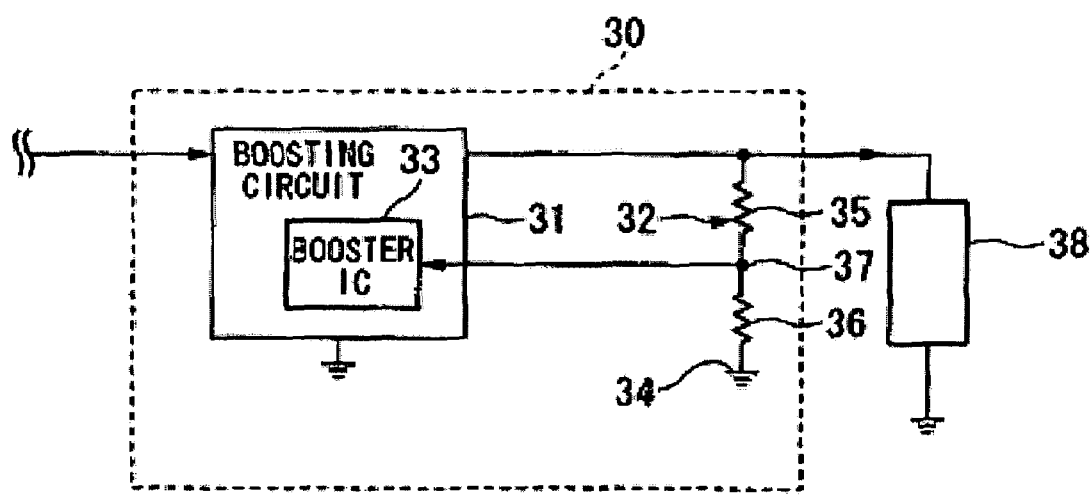
FIG. 4 is a block diagram showing a conventional actuator driving circuit.

The booster IC 15 carries out a feedback control in the boosting circuit 4 by the following structural elements. As shown in FIG. 3, the booster IC 15 has a comparator 18 which is connected to the monitor terminal 17. The comparator 18 has a negative (−) terminal and a positive (+) terminal which are connected to the monitor terminal 17 and a voltage dividing circuit 19, respectively. The voltage dividing circuit 19 divides the source voltage at the dividing ratio determined by resistors 21 and 22.

In the booster IC 15, the comparator 18 compares the output voltage V4 generated by the voltage dividing circuit 16, which divides the boosted voltage V2, with a reference voltage V3 (about 1.25 V, for instance) generated by the voltage dividing circuit 19. When the output voltage V4 from the boosted voltage dividing circuit 16 exceeds the reference voltage V3, the booster IC 15 causes the switching cycle of the field-effect transistor 11 to elongate by means of a switching control circuit (not shown). This operation makes the boosted voltage V2 constant at a predetermined value.

An input electric power and an output electric power to and from the boosting circuit 4 have the relationship represented by the following formula (1):

$$V1 \times I1 = K(V2 \times I2) \tag{1}$$

wherein an input current to the boosting circuit 4 is represented by I1, an output current from the boosting circuit 4 is represented by I2, and a coefficient of boosting efficiency of the boosting circuit 4 is represented by K (K<1). As described above, the boosted voltage V2 is always a constant value which is inherent in the boosting circuit 4, while the output current I2 is variable to control the electromagnetic actuator 2.

With reference back to FIG. 1, the voltage dividing circuit 16 is connected between the ground 9 and the downstream of the boosting circuit 4, i.e., the output terminal of the boosting circuit 4. The voltage dividing circuit 16 consists of resistors R1 and R2 which are connected in serial to divide the boosted voltage V2 and supplies the divided voltage to the booster IC 15 (the voltage dividing circuit 16 may, therefore, be referred to as the "boosted voltage dividing circuit" hereinafter). The resistor R1 has a resistance value (several tens kΩ, for instance) much higher than that of the electromagnetic actuator 2, while the resistor R2 has a resistance value (several kΩ, for instance) higher than that of the electromagnetic actuator 2, but much lower than that of the resistor R1.

A divided voltage restriction circuit 23, which may be referred to as a "boosted voltage controller", is connected to the resistor R1 in parallel. The divided voltage restriction circuit 23 has a resistor R3 and a switch S1 connected in series and is arranged between the boosting circuit 4 and the booster IC 15 to connect the circuits 4 and 15. Similar to the voltage dividing circuit 16 as described above, the resistance value of the resistor R3 is much higher than that of the electromagnetic actuator 2 and is higher than that of the resistor R1. That is, the resistor R3 has a resistance value three times that of the resistor R1, for instance. Since the resistor R3 has a resistance value higher than that of the resistor R, the divided voltage restriction circuit 23 restricts the decrease of the total resistance value of the voltage dividing circuit 16 and the divided voltage restriction circuit 23 at the minimum to restrain unnecessary electric power consumption. Incidentally, a relay or a semiconductor switch such as a transistor may be used as the switch S1.

The switch S1 is controlled by a CPU in an electric control unit (ECU) in the automobile, and is normally in an open state. The electric control unit has a voltage sensor which detects the voltage V1 of the battery 3. When the voltage sensor detects that the voltage V1 of the battery 3 becomes lower than a predetermined level, the electric control unit causes the switch S1 to be in a closed state.

When the switch S1 is in the open state (off state), the boosted voltage V2 can be calculated according to the following formula (2):

$$V2 = \frac{R1 + R2}{R2} \times V3 \tag{2}$$

When the switch S1 is in the closed state (on state), the boosted voltage V2 can be calculated by the following formulas (3) wherein the total or composite resistance of the resistors R1 and R2 is represented by Rt:

$$Rt = \frac{R1 \times R3}{R1 + R3} \quad (3)$$

$$V2 = \frac{Rt + R2}{R2} \times V3$$

The resistance R3 can also be calculated by determining the minimum boosted voltage V2 (min) which can continue to drive the electromagnetic actuator 2 by using the formula (2).

In summary, when the input voltage to the boosting circuit, which is the voltage V1 of the battery 3, becomes low (equal to or less than 11 V, for instance) during the driving of the active control engine mount, the boosting circuit 4 tends to operate to hold the boosted voltage V2 at the previous time by the aforementioned feedback control. In such a case, the current supplied to the input terminal 5 of the boosting circuit 4 if the boosted voltage V2 is held constant. However, according to the embodiment, the electric control unit enables the switch S1 of the divided voltage restriction circuit 23 to be in the closed state in response to the decrease in the voltage of the battery 3. The dividing ratio of the voltage dividing circuit 16 therefore changes from the previous dividing ratio into a new dividing ratio determined by the resistor R3. As a result, the feedback voltage applied to the booster IC 15 increases.

Next, the booster IC controls to cause the switching cycle of the field-effect transistor 11 in the boosting circuit 4 to be elongated. This operation causes the decrease of the boosted voltage V2, i.e., makes the output voltage of the boosting circuit 4 low to restrict the current flowing through the boosting circuit 4. It is possible, therefore, to prevent the boosting circuit 4 from overheating without interrupting the activation of the electromagnetic actuator 2.

Therefore, according to the preferred embodiment, the boosted voltage V2 can be maintained sufficiently to continue to operate the electromagnetic actuator 2 which is always to be driven, owing to provide the divided voltage restriction circuit 23 in parallel to the resistor R1. The boosted voltage V2 is, therefore, decreased at the minimum but necessary amounts so as to prevent the boosting circuit 4 from overheating even when the voltage V1 of the battery 3 becomes low. As a result, the reliability of the active control engine mount is increased.

In recent development of electric devices for automobiles, the electric power consumption of the battery 3 becomes greater than ever. In spite of this fact, the preferred embodiment can avoid the degradation of the damping and suppressing characteristics against the vibration of the engine in the active control engine mount even when the voltage of the battery 3 becomes low. More specifically, the preferred embodiment has high effectiveness in preventing the vibration of the engine from conveying to the body of the automobile even when, for example, an electric generator cannot generate sufficient electric power due to the low rotational speed of the engine such as during an idling state, and when the active control engine mount consumes high electric power due to the enlargement of the vibration of the engine.

Similarly, the booster IC monitors the boosted voltage V2 and surely makes the boosted voltage Vs reduced to an appropriate level even when the voltage V1 of the battery 3 becomes low. Thus, the boosting circuit 4 can keep boosting the input voltage while preventing its overheating. This structural feature may contribute to the salability of the automobile.

Further, the actuator driving circuit having the above structure can perform the control for the shortage of the voltage V1 of the battery 3 by means of hardware without increasing software control for driving the actuator.

The usage of the actuator driving apparatus according to the present invention is not limited to the above-described preferred embodiment. That is, the actuator driving apparatus of the present invention can also be used for the system other than the active control engine mount which is equipped with an actuator of a solenoid type which requires a boosting circuit. For instance, the actuator driving apparatus of the present invention may be used in an injector or an electromagnetic valve. Furthermore, the divided voltage restriction circuit may also be formed by zener diodes rather than the resistors as long as it carries out changing the dividing ratio of the voltage dividing circuit.

As described above, the actuator driving circuit according to the present invention can hold a boosted voltage sufficient to continue driving the electromagnetic actuator which is always in operation. It is possible, therefore, to prevent the boosting circuit from overheating due to increase of the current supplied to the boosting circuit by decreasing the boosted voltage to a minimum but sufficient amount when the source voltage becomes low.

In the actuator driving circuit according to the second aspect of the present invention, the booster IC monitors the boosted voltage and surely makes the boosted voltage reduced to an appropriate level even when the voltage of the battery becomes low. Thus, the boosting circuit can keep boosting the input voltage while preventing its overheating. This structural feature may contribute to the salability of the automobile.

Further, the actuator driving circuit according to the third aspect of the present invention can perform the control for the shortage of the voltage of the battery by means of hardware without increasing software control.

While the preferred embodiment of the invention has been described and illustrated above, it should be understood that is exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An actuator driving circuit for driving an electromagnetic actuator, comprising a boosting circuit which boosts a source voltage, a voltage dividing circuit which is connected to an output terminal of said boosting circuit to divide said boosted voltage generated by said boosting circuit, and a boosted voltage controller which is connected to said output terminal of said boosting circuit, said boosted voltage controller reducing a dividing ratio of said voltage dividing circuit when said source voltage becomes lower than a predetermined level.

2. An actuator driving apparatus as claimed in claim 1, wherein the boosted voltage controller is connected to both the output terminal and a fed-back input of the boosting circuit.

3. An actuator driving apparatus as claimed in claim 1, wherein the output terminal of the boosting circuit is also an input of the boosted voltage controller.

4. An actuator driving circuit as claimed in claim 1, further comprising a booster IC which monitors a divided voltage generated by said voltage dividing circuit, wherein said boosted voltage controller is provided between said output terminal of said boosting circuit and an input terminal of said booster IC.

5. An actuator driving apparatus as claimed in claim 1, wherein said boosted voltage controller is formed of a resistor and a switch.

* * * * *